Nov. 28, 1961    I. B. LASKOWITZ    3,010,675
JET-POWERED EJECTOR ROTORLESS CONVERTIBLE AIRCRAFT
Filed Aug. 15, 1960
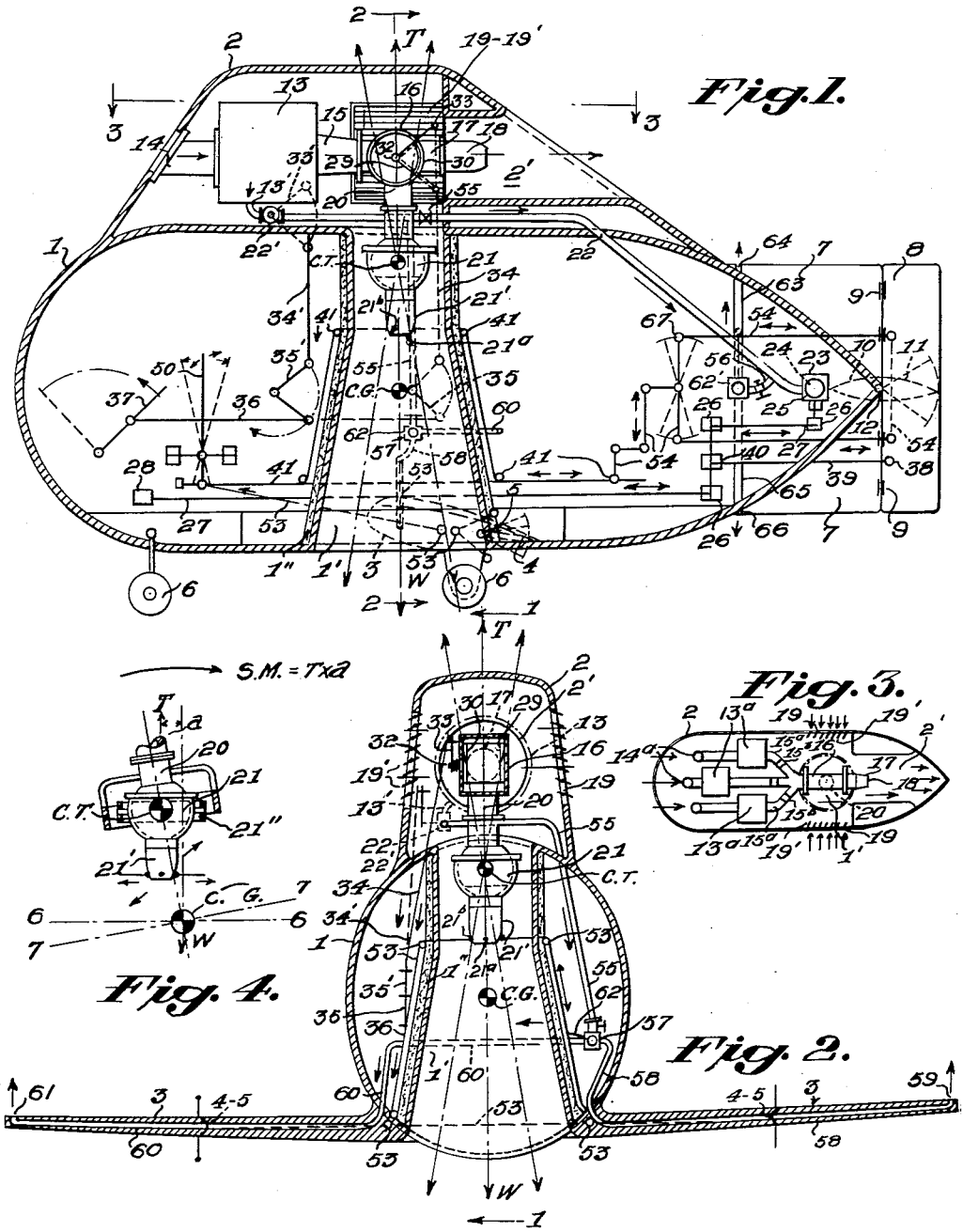
INVENTOR.
Isidor B. Laskowitz.
BY
ATTORNEY.

3,010,675
JET-POWERED EJECTOR ROTORLESS
CONVERTIBLE AIRCRAFT
Isidor B. Laskowitz, 284 Eastern Parkway,
Brooklyn, N.Y.
Filed Aug. 15, 1960, Ser. No. 49,490
20 Claims. (Cl. 244—12)

This invention relates to jet-powered ejector rotorless convertible aircraft, and embodies certain improvements in vertical take-off and landing (VTOL) aircraft as covered by my copending application for Jet-Powered Rotorless Convertible Aircraft, bearing Serial No. 807,556, filed April 20, 1959, and of which the present application is a continuation in part.

Some of the problems facing designers today, in using turbojet engines on vertical take-off and landing aircraft, are the comparatively low thrust and high specific fuel consumption of the engines, high noise level, high temperature and exhaust velocity of the jet, which when impinging on the ground or other landing surface has a damaging erosive effect. It is well recognized that the turbofan engine, with its aft fan drawing in secondary air which intermingles with the exhaust jet, solves to some degree the problems mentioned.

Another approach to solving the deficiencies of the turbojet engine is by employing the "ejector effect" principle. A jet of fluid exhausting in the center of a tube open at both ends produces an "ejector effect" in that a partial vacuum is created at the intake end of the tube and secondary fluid is drawn in, which intermingles with the jet.

It is accordingly a primary object of the present invention to provide a jet-powered ejector rotorless convertible aircraft in which the "ejector effect" principle is applied to a vertical thrust exhaust nozzle and to a horizontal thrust exhaust nozzle to augment the thrust in both directions, reducing the specific fuel consumption, reduce the noise level, and reduce the temperature and velocity of the jet, while endowing the aircraft with adequate stability and control about all three axes for all flight conditions and with inherent (hands-off-control stick) stability under all flight conditions.

Further objects and advantages of the invention will become apparent in the course of the following detailed description, taken in connection with the accompanying drawings, wherein:

FIG. 1 is a vertical longitudinal sectional view of the jet-powered ejector rotorless convertible aircraft in accordance with a preferred structural embodiment of the invention and the view being as observed in the plane of line 1—1 on FIG. 2.

FIG. 2 is a transverse sectional view of the improved aircraft observed in the plane of line 2—2 on FIG. 1.

FIG. 3 is a detailed horizontal sectional view as observed in the plane 3—3 on FIG. 1, but showing three engines instead of one.

FIG. 4 is a diagrammatic sectional view showing the controlled action of the stabilizing moment (S.M.) in vertical flight and hovering and the freely swinging gimbal mounting of the vertical thrust exhaust nozzle, when the aircraft is inclined either laterally or longitudinally.

Referring now in detail to the drawings, the improved aircraft will be seen to comprise a fuselage 1 having surmounted thereon an engine compartment 2 which extends longitudinally of the fuselage. Wings 3 project from opposite sides of the fuselage 1 and are provided with ailerons 4 which are hinged at 5. The fuselage is provided with a landing gear which is preferably retractible, and same is provided with the retractible wheels 6.

Vertical stabilizer surfaces 7 are provided as is a rudder 8 which is hinged as at 9. Horizontal stabilizer surfaces 10 are provided as are also elevator flaps 11 which are hinged at 12.

The fuselage 1 is provided with a circular vertical opening 1' in its interior to permit free discharge of gas and secondary air in vertical flight and hovering. The walls of the fuselage 1 surrounding the opening 1' is covered with heat insulating material 1" to provide protection from the heat of the discharging gas.

Within the compartment 2 is an engine 13 of the turbojet type or other gas producer having an inlet 14 opening through the front end of the compartment, and from this engine extends an exhaust tube 15 which connects to a rotary pressure jet control valve 16. A branch exhaust tube 17 extends towards the rear where it terminates in a discharge nozzle 18 from which the discharging jet produces a direct forward thrust. The compartment 2 is provided with a circular horizontal opening 2' in its interior to permit free discharge of gas and secondary air in forward flight. The compartment 2 is also provided with secondary air inlets 19 on each side of the compartment. The air inlets 19 are provided with protective screens and adjustable louvers 19' to control the flow of secondary air.

A branch exhaust tube 20 extends downwardly from the rotary control valve 16 and connects to an adjustable hollow spherical joint 21 which terminates in a discharge nozzle 21' from which the discharging jet produces a vertical lift thrust T. The exhaust nozzle 21' is provided with a ball bearing gimbal mounting 21", as shown in FIG. 4, to permit the nozzle 21' to swing freely like a pendulum and which tends to remain in a vertical position when the aircraft is inclined either laterally or longitudinally, the gimbal mounting is not shown in FIGS. 1 and 2 for greater clarity in these figures.

As will be readily observed, the arrangement is such that with gas discharging through the horizontal exhaust nozzle 18 in opening 2' and through the vertical exhaust nozzle 21' in opening 1', "ejector effects" are produced and secondary air is drawn in through the air inlets 19 which intermingles with the gas jets to augment the thrust, reduce the specific fuel consumption, reduce the noise nevel, and reduce the temperature and velocity of the jet.

The compressor of the turbojet engine 13 is tapped at 13' and a compressed air bleed line 22 extends from a control valve 22' towards the rear end of the chamber and then downwardly into the fuselage towards the rear end thereof where it terminates in a three-way jet-steering control valve 23. Exhaust tubes 24 and 25 for discharging steering jets from the control valve 23 extend from opposite ends thereof. The jet steering control valve 23 is actuated by levers 26 to which are attached cables 27 connecting at the front end of the fuselage with the opposite ends of a steering foot bar 28. Conventional foot pedals may be used instead of a foot bar. By pushing upon this foot bar with his feet the pilot may adjust the control valve 23 and shut off flow of air through both steering tubes or allow flow of a steering jet through a predetermined steering tube 24 or 25 according to which direction a turn is to be made.

Referring to FIGS. 1 and 2, it will be seen that the rotary control valve 16 has on the inside thereof the rotary valve element 29 provided with the disc portion 30, and a spindle 32 forming a part of the valve element 29 extends through the casing of the control valve 16 and has secured thereto the link 33. Compressed air control valve 22' is shown in the open position and is actuated by a link 33' secured thereto. As shown in the drawing, propelling fluid exhausting from the engine will be directed downward to discharge nozzle 21' since exhaust branch 20 is uncovered by disc portion 30, while compressed air will be directed to jet-steering control valve 23. The control valve 16 is actuated by a rod 34, pivoted at the upper end thereof to the link 33 and at the lower end of the bell-crank lever 35 to which is attached the rear end of a rod 36 which has its front end connected with a lever 37 within reach of the operator of the aircraft. Control valve 22' is actuated by a rod 34' pivoted at the upper end to the link 33' and at the lower end to the bell-crank lever 35' which is also attached to the rod 36. Thus by movement of the lever 37 in a forward direction exhaust branch 20 will be covered by disc portion 30 while exhaust branch 17 will be uncovered thus directing the exhaust jet from the engine rearward to produce a direct forward thrust. At the same time the movement of the lever 37 forward has closed compressed air control valve 22', shutting off air supply to the jet-steering control valve 23.

Rudder 8 has secured thereto a bracket 38 which is connected by links 39 and 40 to the levers 26 for transverse movement by the steering foot bar 28. Thus, movement of the foot bar 28 will not only actuate the rudder 8 but will also actuate the jet-steering control valve 23. The linkages are so arranged that the jet-steering and rudder-steering forces act in the same sense or direction to supplement one another under certain flight conditions. In hovering and vertical flight conditions the jet-steering forces are effective and the rudder, since it is hinged vertically, not effective for directional control. In forward flight, however, the rudder is most effective and with rotary control valve 16 turned to produce a direct forward thrust, the steering-jets are not effective, since the compressed air bleed from the engine to the steering-jets has been cut off by the closing of control valve 22' which is interconnected with the operation of control valve 16. This arrangement prevents the use of jet power for steering not needed in forward flight.

In order that the aircraft may be operated in vertical flight and hovering as a helicopter, rotary control valve 16 is set as shown in FIG. 1 and gas will enter the spherical joint 21 and pass out through the nozzle 21' producing the augmented vertical lift thrust for such operations, with the secondary air drawn in by the "ejector effect." The longitudinal ends 21ᵃ of nozzle 21' are connected by means of cables and sheaves 41 to the fore and aft ends of control lever or stick 50. The transverse ends 21ᵇ of nozzle 21' are connected by means of cables and sheaves 53 to the sides of control stick 50. Since the control stick 50 is mounted for universal tilting movement, it may be moved forward, backward, to the right, or to the left and as a consequence tilt the nozzle 21' and hence vary the direction of the lift thrust longitudinally or transversely as indicated by the dot and dash lines and arrows in FIGS. 1 and 2. This variation in thrust, in any direction of the compass, is similar to that produced in the rotor of a helicopter by cyclic or differential pitch change of the rotor blades.

As indicated in FIG. 4, since the nozzle 21' is freely suspended in the gimbal mounting 21", with hands off the control stick 50, the nozzle 21' always tends to assume a vertical position by the action of gravity, producing the stabilizing moment (S.M.), when the horizontal axis 6—6 of the aircraft is inclined either laterally or longitudinally to position 7—7 and thus endowing the aircraft with inherent (hands-off-control stick) stability.

The ailerons 4 of the fixed wings 3 are also connected by means of cables and sheaves 53 to the sides of the control stick 50, so that movement of the stick 50 to the right will raise one aileron and lower the other, while moving the stick to the left will reverse the movement of the ailerons.

The elevator flaps 11 of the horizontal stabilizer surfaces 10 are connected by means of the linkage 54 to the control stick 50, through the cables and sheaves 41, so that movement of the stick 50 forward will lower the elevator flaps, while movement of the stick backward will raise the elevator flaps.

To provide supplemental lateral and longitudinal stability control forces, in vertical flight and hovering, a compressed air branch 55 for lateral control and air branch 56 for longitudinal control are provided. Both branches 55 and 56 are taken off the compressed air bleed line 22. Branch 55 terminates in a three-way lateral control valve 57 from which a compressed air branch 58 extends through the fixed wing 3 to a nozzle 59 on one side, and from which a compressed air branch 60 extends through the fixed wing 3 and to a nozzle 61 on the other side. An operating link 62 connects lateral control valve 57 through cables and sheaves 53 leading to the sides of control stick 50. Movement of the stick 50 to the right will divert compressed air to nozzle 59, while moving the stick to the left will divert compressed air to nozzle 61 thus providing a controlled lateral supplemental stabilizing movement.

Branch 56 terminates in a three-way longitudinal control valve 62' from which a compressed air branch 63 extends through the fuselage 1 to a nozzle 64 above and from which a compressed air branch 65 extends through the fuselage to a nozzle 66 below. An operating link 67 connects longitudinal control valve 62' to the linkage 54 which is connected through the cables and sheaves 41 to the front and rear ends of control stick 50. Movement of the stick 50 forward will divert compressed air to nozzle 66, while moving the stick backward will divert compressed air to nozzle 64, thus providing a controlled longitudinal supplement stabilizing moment.

The connections between control stick 50, the discharge nozzle 21' of the spherical joint 21, the ailerons 4, the elevator flaps 11, the lateral control valve 57 and the longitudinal control valve 62' are such that movement of the control stick in any direction varies the lift thrust forces, aileron forces, elevator forces and supplemental lateral and longitudinal jet forces in the same sense or direction; that is, the various forces produced supplement one another and hence will give rise to better stability and control of the aircraft. Since the freely suspended nozzle 21' always tends to assume a vertical position, whether gas is discharging through it or not, with hands-off the control stick, the nozzle 21' moves freely with the control stick. As a result the various forces mentioned come into play, when the aircraft is inclined either laterally or longitudinally, to give the aircraft inherent stability under all flight conditions.

Referring to FIG. 3, an arrangement is shown of the power plant and ducting for large transport-type of aircraft and wherein three turbojet engines 13ᵃ having inlet tubes 14ᵃ are mounted in the forward portion of the engine compartment 2, and have exhaust tubes 15ᵃ connected to the inlet end of the rotary pressure jet control valve 16. Valves 15ᵇ of butterfly type or other suitable type, remotely operated by the pilot, are provided in the exhaust tubes 15ᵃ or may be installed in the inlet tubes 14ᵃ for shutting off the tubes of a particular jet engine when it becomes inoperative to reduce the drag and prevent back-flow from the operating engines. The discharge nozzle 18 at the end of branch exhaust tube 17 is preferably of the adjustable area type.

This simple arrangement of multiple engines provides the safety and flexibility required of large transport-type of aircraft at a minimum of frontal area and hence minimum drag employing the "ejector effect" principle to augment both the vertical and horizontal thrust and retaining all the advantages and important features heretofore described.

*Operation*

To use the improved jet-powered ejector rotorless convertible aircraft as a helicopter, the engine (or engines) is started and air is drawn in through the inlet 14, while the exhausting fluid, forming the power medium, is discharged through the nozzle 21' at the end of spherical joint 21, creating an "ejector effect" in opening 1' which draws in secondary air through the air inlets 19 that intermingles with the exhausting fluid to produce an augmented lift thrust. The intensity of this lift thrust may be controlled, by the operator of the aircraft, by adjusting the throttle of the engine.

In hovering and vertical flight conditions the lift thrust carries the full weight of the aircraft and stability and control, about all three axes, is obtained by manipulation of control stick 50 and the steering foot bar 28. Under these conditions the ailerons 4, elevator flaps 11 and rudder 8 are ineffective since there is no air-stream over their effective surfaces. Lateral and longitudinal stability is obtained by variation in the lift thrust and the supplemental lateral and longitudinal jet forces, while directional control is obtained by the force of the steering jets. Inherent (hands-off-control stick) stability is afforded by the freely swinging gimbal mounted exhaust nozzle 21' producing the stabilizing moment (S.M.).

In forward flight, with the aircraft still operating as a helicopter, the weight is divided between the vertical component of the lift thrust and the fixed wings; the extent of this division depending on the speed of forward flight and the inclination of the lift thrust. The horizontal component of the lift thrust is the propelling forward flight force. Stability and control is obtained as before by manipulation of the control stick and the steering foot bar. Under these conditions the ailerons, elevator flaps, and rudder are effective since the air-stream is horizontal. Lateral and longitudinal stability is obtained now by variation in the lift thrust, supplemented by lateral and longitudinal jet forces and by aileron and elevator forces. Directional control is accomplished by the force of the steering jets supplemented by the rudder forces.

To convert the improved aircraft while in forward flight, from helicopter operation to operation as a conventional airplane, it is necessary to slowly move lever 37 forwardly and adjust the inclination of the aircraft by means of the control stick 50. Discharge of the engine jet will now be to the rear and an augmented direct forward propelling force will be produced. Stability and control while flying as an airplane is again obtained by manipulation of the control stick and the steering foot bar. Since the compressed air bleed control valve 22' was closed when lever 37 was moved forward there is no air pressure available for supplemental lateral and longitudinal jet control nor for jet-steering. In this condition of flight, lateral and longitudinal stability is obtained by variation of the aileron and elevator forces while directional control is accomplished by the rudder forces alone. With hands-off-the control stick the freely swinging vertical exhaust nozzle operates the ailerons and elevator flaps, since they are interconnected, to provide inherent stability.

From the preceding description of the improved jet-powered ejector rotorless convertible aircraft it will be seen that augmentation of the jet engine thrust both vertically and horizontally has been provided as well as inherent stability and adequate stability and control, for all conditions of flight, when operating both as a helicopter, as an airplane and intermediate to these two types of aircraft. It has been further shown experimentally that the "ejector effect" described increases the thrust and reduces the specific fuel consumption, the noise level, and the temperature and velocity of the jet.

Obviously, minor changes may be made in the preferred embodiments of my invention without departing from the essence of the invention, and it is therefore understood that the specific embodiments shown and described are illustrative of the invention and not restrictive, and that changes in construction and arrangement of parts may be made within the scope of the claims.

What I claim and desire to secure by U.S. Letters Patent is:

1. In a jet-powered ejector rotorless and convertible aircraft, a fuselage, an engine compartment surmounting the fuselage, fixed wings extending from opposite sides of the fuselage, ailerons pivoted to the wings, vertical stabilizer surfaces on the rear end of the fuselage, a rudder pivoted to said surfaces, horizontal stabilizer surfaces on the rear end of the fuselage, elevator flaps pivoted to the horizontal stabilizer surfaces, a turbojet-type engine in the engine compartment, an inlet to the engine, an exhaust tube from the engine, a rotary pressure jet control valve in the engine compartment in communication with said exhaust tube, a branch exhaust tube extending downwardly from said rotary pressure jet control valve into an open ended tube to produce an ejector effect, a horizontal exhaust tube extending rearwardly from said valve into an open ended tube to produce an ejector effect, secondary air inlets to said open ended tubes, and a compressed air bleed tube extending from said engine to a jet-steering control valve in the rear end of the fuselage, said rotary pressure jet control valve including rotary means for alternately closing the horizontal exhaust tube and the vertical exhaust tube, and operator control means in the forward part of said fuselage for operating said rotary means and jet-steering control valve, whereby the aircraft is convertible from a helicopter to an airplane and vice versa.

2. The structure according to claim 1, wherein said vertically disposed exhaust tube is connected to an adjustable, freely swinging, gimbal mounted hollow spherical joint which terminates in a downwardly directed discharge nozzle.

3. The structure according to claim 2, wherein said fuselage is provided with an open ended vertical tubular opening beneath said rotary pressure jet control valve, said hollow spherical joint and said nozzle being disposed in said opening, and secondary air inlets in communication with the upper end of said opening.

4. A jet-powered ejector rotorless and convertible aircraft comprising a fuselage, an engine compartment surmounting the fuselage, a turbo-jet type engine in said compartment, an inlet to the engine, a control valve in said compartment, an exhaust tube disposed between said engine and said valve and in communication therewith, a horizontal opening in said engine compartment, a second exhaust tube projecting horizontally from said valve in said horizontal opening, a vertical opening in said fuselage beneath said valve, a third exhaust tube extending vertically downwardly from said valve, a vertically disposed discharge nozzle in said vertical opening, a freely swinging flexible joint intercommunicating said third exhaust tube and said discharge nozzle, and secondary air inlets in said engine compartment in communication with intake ends of said horizontal and vertical openings.

5. The structure according to claim 4, together with adjustable means in said control valve operable to selectively direct exhaust gases through said second and said third exhaust tubes.

6. The structure according to claim 4, wherein said vertical opening is defined in part by a circular wall, and insulating material on the inner face of said wall.

7. The structure according to claim 6, together with cables and sheaves on the outer faces of the insulating material, and a control stick operatively connected to said cables and sheaves for adjusting and operating a flexible joint, ailerons, elevator flaps and supplemental lateral and longitudinal stability control jets, to provide stability and control and inherent hands-off-control-stick stability under all conditions of flight.

8. The structure according to claim 4, together with remotely controlled means for adjusting the inclination of said vertically disposed discharge nozzle to vary the direction of said vertical thrust and thus provide lateral and longitudinal stability and control.

9. The structure according to claim 2, wherein the center of said freely swinging hollow spherical joint and hence the center of the vertical thrust is disposed directly above the center of gravity of aircraft to provide inherent (hands-off-control stick) stability of said aircraft.

10. The structure according to claim 1, wherein said compressed air bleed tube is provided with a control valve operatively connected to said rotary pressure jet control valve for simultaneous operation.

11. The structure according to claim 1, together with two additional branch compressed air bleed tubes and control valves connected to said compressed air bleed tubes for supplemental lateral and longitudinal stability and control of said aircraft and means interconnecting said last named control valves with said ailerons and elevator flaps for simultaneous adjustment.

12. The structure according to claim 1, together with an operating member in the fuselage, and connections from such member for simultaneous adjustment of said jet-steering control valve and said rudder.

13. The structure according to claim 4, wherein said secondary air inlets are provided with protective screens and adjustable louvers to control the flow of secondary air.

14. The structure according to claim 4, together with a plurality of engines in said engine compartment, and separate exhaust connections from said engines to said control valve.

15. In a jet-powered ejector rotorless and convertible aircraft, a fuselage, an engine compartment adjacent to said fuselage, fixed wings extending from opposite sides of the fuselage, ailerons pivoted to the wings, vertical stabilizer surfaces on the rear end of the fuselage, a rudder pivoted to said surfaces, horizontal stabilizer surfaces on the rear end of the fuselage, elevator flaps pivoted to the horizontal stabilizer surfaces, a turbojet engine mounted in the engine compartment, an inlet to the engine, an exhaust tube from the engine, a pressure jet control valve in the engine compartment in communication with said exhaust tube, a horizontal exhaust tube extending rearwardly from said valve into an open ended tube for producing an augmented direct forward thrust, and an additional exhaust tube extending vertically downwardly from said valve into an open ended tube and terminating in a vertical freely swinging adjustable nozzle for producing an augmented variable vertical thrust, secondary air inlets to said open ended tubes, a compressed air bleed control valve with a tube extending from said engine to a jet-steering control valve having exhaust tubes extending laterally from the opposite sides thereof, a branch compressed air bleed tube extending to a supplemental lateral control valve having exhaust tubes extending from the opposite sides thereof through said fixed wings and another branch compressed air bleed tube extending to a supplemental longitudinal control valve having exhaust tubes extending vertically from the opposite sides thereof, a control stick universally mounted in said fuselage, linkage, cables and sheaves interconnecting said vertical adjustable nozzle, supplemental control valves, ailerons, elevator flaps and said control stick, foot-operated directional control means mounted in said fuselage, linkage interconnecting said rudder, said jet-steering valve and said foot-operated control means, and oscillating lever control means connected to said pressure jet control valve for directing the exhaust from said turbojet engine either vertically to said adjustable nozzle or horizontally to said horizontal exhaust tube or partly vertically and horizontally as desired by the operator.

16. In a jet-powered ejector rotorless and convertible aircraft, a fuselage, an engine compartment adjacent to said fuselage, fixed wings extending from opposite sides of the fuselage, ailerons pivoted to the wings, vertical stabilizer surfaces on the rear end of the fuselage, a rudder pivoted to said surfaces, horizontal stabilizer surfaces on the rear end of the fuselage, elevator flaps pivoted to the horizontal stabilizer surfaces, multiple turbojet engines mounted in the engine compartment, an inlet to each engine, an exhaust tube with a valve from each engine, a pressure jet control valve in the engine compartment in communication with each of said exhaust tubes, a horizontal exhaust extending rearwardly from said valve into an open ended tube for producing an augmented direct forward thrust, and an additional exhaust tube extending vertically downwardly from said valve into an open ended tube and terminating in a vertical freely swinging adjustable nozzle for producing an augmented variable vertical thrust, secondary air inlets to said open ended tubes, a compressed air bleed control valve with tubes extending from said engines to a jet-steering control valve having exhaust tubes extending laterally from the opposite sides thereof, a branch compressed air bleed tube extending to a supplemental lateral control valve having exhaust tubes extending from the opposite sides thereof through said fixed wings, and another branch compressed air bleed tube extending to a supplemental longitudinal control valve having exhaust tubes extending vertically from the opposite sides thereof, a control stick universally mounted in said fuselage, linkage, cables and sheaves interconnecting said vertical adjustable nozzle, supplemental control valves, ailerons, elevator flaps and said control stick, foot-operated directional control means mounted in said fuselage, linkage interconnecting said rudder, said jet-steering control valve and said foot-operated control means, and oscillating lever control means connected to said pressure jet control valve for directing the exhaust from said turbojet engines either vertically to said adjustable nozzle or horizontally to said horizontal exhaust tube or partly vertically and horizontally as desired by the operator.

17. The structure according to claim 15, together with protective screens and adjustable louvers mounted in said secondary air inlets to control the flow of secondary air.

18. The structure according to claim 16, together with protective screens and adjustable louvers mounted in said secondary air inlets to control the flow of secondary air.

19. In a jet-powered ejector rotorless and convertible aircraft, a fuselage, an engine compartment adjacent to said fuselage, fixed wings extending from opposite sides of the fuselage, ailerons pivoted to the wings, vertical stabilizer surfaces on the rear of the fuselage, a rudder pivoted to said surfaces, horizontal stabilizer surfaces on the rear of the fuselage, elevator flaps pivoted to the horizontal stabilizer surfaces, a turbojet engine mounted in the engine compartment, an inlet to the engine, an exhaust from the engine, a pressure jet control valve in the engine compartment connected to said exhaust tube, a horizontal exhaust tube extending rearwardly from said valve into an open ended tube for producing an augmented direct forward thrust, and an additional exhaust tube extending downwardly from said valve into an open ended tube and terminating in a freely swinging adjustable nozzle for producing an augmented variable vertical thrust, secondary air inlets to said open ended tubes, a compressed air bleed control valve with a tube extending from said engine to a jet-steering control valve, a branch compressed air bleed tube extending to a supplemental lateral control valve, and another branch compressed air bleed tube extending to a supplemental longitudinal control valve, a control mechanism universally mounted in said fuselage and interconnected to said adjustable nozzle, said supplemental control valves, ailerons, and elevator flaps, foot-operated directional control mechanism interconnected to said rudder and said jet-steering control valve and oscillating lever control means connected to said compressed air bleed control valve and said pressure jet control valve for shutting off air bleed when no longer needed and for directing the exhaust from said turbojet engine either vertically to said adjustable nozzle or horizontally to said horizontal exhaust tube, whereby the aircraft may be converted from helicopter to airplane operation and vice versa.

20. In a jet-powered ejector rotorless and convertible aircraft, a fuselage, an engine compartment adjacent to said fuselage, fixed wings extending from opposite sides of the fuselage, ailerons pivoted to the wings, vertical stabilizer surfaces on the rear of the fuselage, a rudder pivoted to said surfaces, horizontal stabilizer surfaces on the rear of the fuselage, elevator flaps pivoted to the horizontal stabilizer surfaces, multiple turbojet engines mounted in the engine compartment, an inlet to each engine, an exhaust tube with a valve from each engine, a pressure jet control valve in the engine compartment connected to each of said exhaust tubes, a horizontal exhaust tube extending rearwardly from said valve into an open ended tube for producing an augmented direct forward thrust, and an additional exhaust tube extending downwardly from said valve into an open ended tube and terminating in a freely swinging adjustable nozzle for producing an augmented variable vertical thrust, secondary air inlets to said open ended tubes, a compressed air bleed control valve with tubes extending from said engines to a jet-steering control valve, a branch compressed air bleed tube extending to a supplemental lateral control valve, and another branch compressed air bleed tube extending to a supplemental longitudinal control valve, a control mechanism universally mounted in said fuselage and interconnected to said adjustable nozzle, said supplemental control valves, ailerons, and elevator flaps, foot-operated directional control mechanism interconnected to said rudder and said jet-steering control valve and oscillating lever control means connected to said compressed air bleed control valve and said pressure jet control valve for shutting off air bleed when no longer needed and for directing the exhaust from said turbojet engines either vertically to said adjustable nozzle or horizontally to said horizontal exhaust tube, whereby the aircraft may be converted from helicopter to airplane operation and vice versa.

References Cited in the file of this patent
UNITED STATES PATENTS 2,959,374   Laskowitz _____ Nov. 8, 1960